US007099465B2

(12) United States Patent
Nishi

(10) Patent No.: US 7,099,465 B2
(45) Date of Patent: Aug. 29, 2006

(54) HIGHLY RECYCLABLE KEYPAD WITH A KEY TOP AND METHOD OF SEPARATING THE SAME

(75) Inventor: Kengo Nishi, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 447 days.

(21) Appl. No.: 10/097,242

(22) Filed: Mar. 15, 2002

(65) Prior Publication Data

US 2002/0172354 A1 Nov. 21, 2002

(30) Foreign Application Priority Data

Mar. 21, 2001 (JP) ............................ 2001-081639

(51) Int. Cl.
*H04M 1/00* (2006.01)
*H01H 3/12* (2006.01)
*H01H 13/70* (2006.01)

(52) U.S. Cl. .................... 379/433.07; 200/341; 341/22

(58) Field of Classification Search ................ 379/368, 379/433.06, 433.07, 422; 200/314, 341; 341/22

See application file for complete search history.

(56) References Cited

U.S. PATENT DOCUMENTS

| | | | | |
|---|---|---|---|---|
| 5,234,744 | A | 8/1993 | Kenmochi | |
| 6,196,738 | B1 * | 3/2001 | Shimizu et al. | 200/314 |

FOREIGN PATENT DOCUMENTS

| | | |
|---|---|---|
| JP | 2627692 | 4/1997 |

* cited by examiner

*Primary Examiner*—Harry S. Hong
(74) *Attorney, Agent, or Firm*—Rader, Fishman & Grauer PLLC

(57) ABSTRACT

A keypad with a key top (6) according to the present invention is a keypad with a key top (6) manufactured by bonding a keypad (1) made of a thermoplastic elastomer to a key top (5) made of a thermoplastic resin and being molded as a separate member from the keypad (1) with an adhesive (3) made from a reaction curing resin that swells when contacted with an organic solvent. A keypad with a key top (6) can be easily separated into a separate keypad (1) and a separate key top (5) by making this adhesive that bonds the keypad with the key top (6) swell when contacted with an organic solvent. Therefore, this keypad with the key top (6) is excellent in recyclability.

11 Claims, 3 Drawing Sheets

HIGHLY RECYCLABLE KEYPAD WITH A KEY TOP AND METHOD OF SEPARATING THE SAME

BACKGROUND OF THE INVENTION

1. Field of the Invention

The present invention relates to a keypad unit with a key top portion for use in cellular phones, mobile communication devices, remote controls for various household electrical appliances, card remote controls and various keyboards, and also relates to a method of separating a key top portion and a keypad portion from a keypad unit having the key top portion (hereinafter "a keypad with a key top").

2. Description of the Related Art

In recent several years, the demand of terminals such as cellular phones has expanded rapidly, and design variations of push button switches have increased with the expansion. As described in the publication of Japanese Patent No. 2,627,692, a key top and a keypad are separately molded as a separate member, and a keypad with a key top for a push button switch that is formed by making these stick together with an adhesive is becoming the mainstream because of its excellence in both function and design. Silicone rubber is mainly used for the keypad with the key top because silicone rubber is excellent in cold resistance, heat resistance, weather resistance, precision moldability and electric insulation.

However, silicone rubber is a crosslinked polymer, so the recycling of silicone rubber is not easy. The difficulty in recycling has recently become a big issue as understanding of the global environment is more and more significant.

On the other hand, the use of a thermoplastic elastomer as a material for a keypad instead of silicone rubber is extremely effective in recycling. However, because such a keypad is made of a thermoplastic elastomer, and coupled with a key top that is separately molded, deterioration of the quality of a recycled product results from a recycling process. Thus it is required to separate and classify these.

From such points of view, a keypad with a key top that can be easily recycled has been in demand. Also, there is a demand for a method of easily separating a key top and a keypad.

SUMMARY OF THE INVENTION

The present invention has been completed to solve such problems, and it is an object of the present invention to provide a keypad with a key top (i.e. "a keypad unit having a key top portion and a keypad portion") that is recyclable.

It is another object of the present invention to provide a separation method that can easily separate and classify each member constituting a keypad with a key top in order to recycle this keypad with the key top.

That is, the present invention is a keypad with a key top made by adhering a keypad (portion) comprising a thermoplastic elastomer, and a key top (portion) made of a thermoplastic resin and molded as a separate member from the keypad, with an adhesive made from a reaction curing resin that swells when in the presence of an organic solvent. In this keypad with the key top, the adhesive that bonds a keypad to a key top swells when in the presence of an organic solvent, so that the volume of the adhesive portion increases and consequently applies sufficient stress to the adhesion interface to easily separate the key top and the keypad. Since both the key top and the keypad are made of a thermoplastic material, they are recyclable. Furthermore, if an adhesive made from a reaction curing resin, that swells when in the presence of an alcoholic organic solvent, having less than 10 carbon atoms is used, a key top and a keypad can be separated without dissolving the key top and the keypad. Thus it is easy to classify a key top and a keypad.

Particularly, if a keypad with a key top includes a keypad made of at least one thermoplastic elastomer selected from the group consisting of styrene thermoplastic elastomers, ester thermoplastic elastomers and urethane thermoplastic elastomers, a key top made of at least one thermoplastic resin selected from the group consisting of polycarbonate resins, acrylic resins, styrene resins and acrylonitrile-butadiene-styrene resins, and an adhesive made from at least one reaction curing resin selected from the group consisting of urethane resins, epoxy resins, amino resins, acrylic resins and crosslinked cyanoacrylate resins, the keypad with the key top is excellent in recyclability and is rich in design variations. The keypad with the key top also has high productivity and workability.

Moreover, the present invention provides a method of the separation of a keypad with a key top made by bonding a keypad that is made of a thermoplastic elastomer to a key top made of a thermoplastic resin and is molded as a separate member from the keypad, with an adhesive made from a reaction curing resin that swells in the presence of an organic solvent, and the method includes separating the keypad and the key top by swelling the adhesive using the organic solvent. According to this separation method, the adhesive that bonds a keypad to a key top swells when in the presence of an organic solvent, so that the volume of the adhesive portion increases to apply sufficient stress to the adhesion interface to easily separate the key top and the keypad. Consequently, it is possible to recycle them separately.

In addition, according to the separation method of separating a key top, a keypad and an adhesive that the present invention provides, it is possible to reduce the amount of impurities contained in a raw material after recycling, and this makes it possible to provide recycled materials of good quality. In particular, if an alcoholic organic solvent having less than 10 carbon atoms is used, it is easy to separate and classify a key top and a keypad because the key top and the keypad portions do not dissolve in this alcoholic organic solvent.

The contents of the present invention should not be limited to the above description, and the objects, advantages, features and uses of the present invention will become more apparent from the following description given by reference to the accompanying drawings. It is also to be understood that any and all appropriate modifications that may be made without departing from the spirit of the present invention should be within the scope of the present invention.

DETAILED DESCRIPTION OF THE PREFERRED EMBODIMENTS

1. Description of a Keypad

Figure 1:
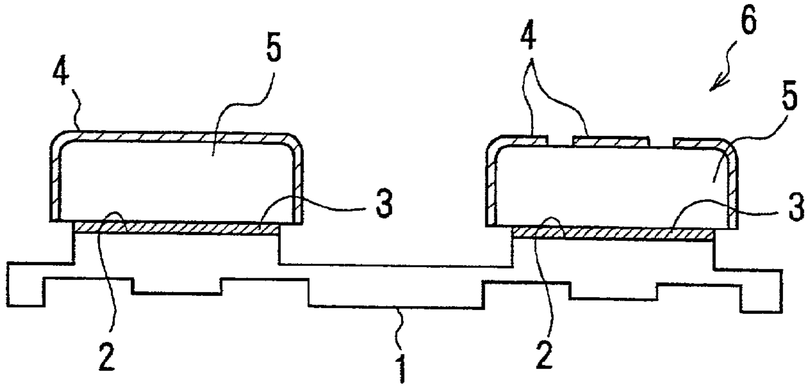
FIG. 1 is a longitudinal sectional view showing an embodiment of a keypad with a key top of the present invention.

A keypad for use in the present invention is one made of a thermoplastic elastomer. Any thermoplastic elastomer having rubbery elasticity may be used. Typical examples of such thermoplastic elastomers include, for example, styrene, ester, urethane, olefinic, amide, butadiene, ethylene-vinyl acetate, vinyl chloride, fluororubber, isoprene and chlorinated polyethylene. In the present invention, the thermoplastic elastomer for use in a keypad may contain various additives and the like that are included through processing a keypad itself. Alternatively, additives and the like can be included through the production of a thermoplastic elastomer prior to keypad formation.

If a transparent thermoplastic elastomer is used as a thermoplastic elastomer, a design formed on a key top can be illuminated with light by shining light on the backside (the keypad side) of a keypad with a key top. And if a light curing resin is used for an adhesive, a keypad and a key top can be easily bonded by curing, so this is preferable in terms of improving productivity. In the case of curing an adhesive made from a light curing resin, at least the portion of a keypad on which the light curing resin is applied is required to have some transmittancy sufficient to transmit the light of wavelengths in the range of 200 to 780 nm to cure the light curing resin.

Any transparent thermoplastic elastomer that transmits light in the range from the ultraviolet to the visible region may be used. Typical examples of transparent thermoplastic elastomers include, for example, styrene, ester, and urethane thermoplastic elastomers.

Various kinds of decoration may be provided on a keypad. For example, coloring may be given to a keypad, and a design in which letters, numbers, symbols, picture patterns and so on are formed may be provided. Furthermore, a shading portion may be formed on a keypad made of a transparent material, and a design in which letters, numbers, symbols, picture patterns and the like are hollowed out of the shading portion may be formed.

The keypad for use in the present invention may be manufactured by molding from a die. Using, for example, injection molding, compression molding, transfer molding and the like, a keypad can be obtained by filling a die having the shape of a desired keypad with a thermoplastic elastomer that is heated and molten, and thereafter solidifying the thermoplastic elastomer.

2. Description of a Key Top

A key top for use in the present invention is one made of a thermoplastic resin. The compositions and kinds of this thermoplastic resin are not particularly limited. Typical examples include, for example, resins such as polycarbonate resin, poly(methyl methacrylate) resin, polystyrene resins, polyacrylic copolymer resins, polyolefin resins, acrylonitrile-butadiene-styrene resin, polyester resins, epoxy resins, polyurethane resins, polyamide resins and silicone resins, and thermoplastic elastomers such as styrene, ester, urethane, olefinic, amide, butadiene, ethylene-vinyl acetate, vinyl chloride, fluororubber, isoprene and chlorinated polyethylene thermoplastic elastomers. Also, the elastic modulus and color tone of the thermoplastic resin are not particularly limited, and highly recyclable thermoplastic resins are preferable. Furthermore, the thermoplastic resin for use in a key top in the present invention may contain various additives and the like that are included through processing into a key top itself. Alternatively, additives and the like can be included through the production of a thermoplastic resin prior to formation of the key top.

A key top is not only a portion showing information about each key, but also a portion that is regarded as important to the design because a key top is present on the surface of a product. Therefore various kinds of decoration may be provided on the right side or the reverse side of a key top. For example, coloring may be given to a key top, and a design in which letters, numbers, symbols, picture patterns and so on are formed may be provided. Furthermore, a shading portion may be formed on a key top, and a design in which letters, numbers, symbols, picture patterns and the like are hollowed out of the shading portion may be formed. A coating layer may be further provided. Moreover, the shapes of the surface of a key top and the adhesion interface to a keypad are generally flat, but a concavity and a convexity for positioning an adherend may be molded, or thinning or hollowing for lightening or improving moldability may be performed. Thus any shape of the surface and the adhesion interface may be provided. In addition, the surface and the adhesion interface of a key top may be modified by plating, vapor deposition, sputtering and the like. Accordingly, in terms of adding various functions, designs and the like, a key top may be constituted by plural components, but in this case at least a base member portion is required to be a thermoplastic resin.

If an illuminated system is adopted for a key top, for example, if the key top portion is illuminated, or if the key top portion has a characteristic that a design formed on the backside of the key top is made visible through the key top, or if the design is illuminated, the material for the key top is required to be transparent. Here transparency includes translucency. Polycarbonate resin, poly(methyl methacrylate) resin, polystyrene resins, polyacrylic copolymer resins, transparent acrylonitrile-butadiene-styrene and the like are transparent, and these are preferable in terms of providing many options especially of designing the key top. If a light curing resin is used for an adhesive, light may be shone from the right side (the key top side) of a keypad with a key top. In that case, at least the portion of a key top on which the light curing resin is applied is required to have sufficient transmittancy to transmit the lights of wavelengths in the range of 200 to 780 nm to cure the light curing resin.

The key top for use in the present invention can be manufactured by molding by die molding or cutting processing. Using, for example, injection molding, compression molding, transfer molding, rotation molding and the like, a key top can be obtained by filling a die having the shape of a desired key top with a resin that is heated and molten or a liquid uncured resin and solidifying the resin. Cutting methods in cutting processing are not particularly limited.

3. Adhesive

A reaction curing resin is used for the adhesive that bonds a key top to a keypad. Any reaction curing resin that is crosslinked and swells when in the presence of an organic solvent may be used. Since the resin needs to be crosslinked, thermoplastic resins that have no three-dimensional network structure are not included. Furthermore, it is considered that it is preferable to cause swelling of 2% by weight or greater in terms of the rate of weight increase of the resin. Weight increase of 2% by weight or greater by swelling is one of the standards showing a degree of "swelling" that is capable of separation, and the extent of the weight increase was obtained empirically through the examples of the present invention described below. Various kinds of materials can be optionally used for each of a key top, an adhesive and a keypad, and thus, it is considered that depending on the combination of such materials, there are some adhesives showing "swelling" that is capable of separation even if the weight increase is smaller than 2% by weight. That is, "swelling" in the present invention means the state of an adhesive where the adhesive swells by absorbing an organic solvent, so that the volume of the adhesive increases, thereby applying stress to the adhesion interface, whereby a key top and a keypad are easily separated and classified by means of at least any one of human hands, mechanical means and being allowed to stand.

The reason why a reaction curing resin is used for an adhesive is that it is necessary to be crosslinked so as to react to form a three-dimensional network structure. Since thermoplastic resins cause no crosslinking, they form no three-dimensional network structure, and they are likely to be dissolved in an organic solvent. Therefore they are not suitable. Organic solvents that dissolve adhesives of thermoplastic resins also dissolve easily even a keypad and a key top. Therefore, it is expected that since these and the adhesives of thermoplastic resins are mixed, it becomes difficult to separate the mixture. On the other hand, if the adhesive is a reaction curing resin, it forms a three-dimensional network structure by crosslinking, and thus, it is not dissolved in an organic solvent although it may swell with an organic solvent. Therefore, even if a key top or a keypad is dissolved in an organic solvent, it is not mixed with an adhesive made from a reaction curing resin, and they can be separated.

The mechanism by which a key top and a keypad are separated by swelling of an adhesive with an organic solvent is not elucidated. It is considered as its reasons, however, that the volume of the reaction curing resin expands by swelling to apply stress to the adhesion interface, and that the bonds by intermolecular force and hydrogen bonds that offer adhesion force may be broken by the permeation of the organic solvent into the interface.

The "reactions" in the reaction curing resin that is used as an adhesive in the present invention are not particularly limited, and either of photoreaction and thermal reaction will do. Typical examples of such reactions include, for example, radical polymerization reaction, cationic polymerization reaction, anionic polymerization reaction, addition reaction and condensation reaction. Typical examples of reaction curing resins include, for example, urethane resins, epoxy resins, amino resins, silicone resins, and acrylic resins such as urethane acrylate, polyester acrylate and epoxy acrylate, and crosslinked cyanoacrylate resins. The reaction curing resin used as an adhesive for use in the present invention may contain additives and the like that are contained during the steps of the production of the reaction curing resin. Reactive diluents may be added to the adhesive for use in the present invention, and fillers, oxidative deterioration inhibitors, antifoaming agents and the like may also be contained in the adhesive.

These reaction curing resins can be used in the form of heat curing type, light curing type, moisture curing type, pressure-moisture curing type or the like.

Heat curing type reaction curing resins are preferable because the adhesion step tends to be shorter when heat is applied. Typical examples of heat curing type reaction curing resins include urethane resins, epoxy resins, amino resins, silicone resins, and acrylic resins such as urethane acrylate, polyester acrylate and epoxy acrylate, and crosslinked cyanoacrylate resins.

Pressure-moisture curing type, or light curing type, reaction curing resins are preferable because they are capable of quick curing at low temperatures, and they offer quick adhesion in seconds, so that the adhesion step can be shortened. In addition, they are preferable because it is unnecessary to heat them; thus, it is easy to use resins having a low softening point that are represented by acrylonitrile-butadiene-styrene as a key top. Similarly, thermoplastic elastomers having relatively low heat resistance that are represented by styrene thermoplastic elastomers can be used as a keypad. Typical examples of pressure-moisture curing type reaction curing resins include cyanoacrylate resins, and typical examples of light curing type reaction curing resins include acrylic resins and epoxy resins.

If an illuminated system is adopted for a key top, it is necessary to use a transparent reaction curing resin as an adhesive. Typical examples of transparent reaction curing resins include urethane resins, epoxy resins, amino resins, silicone resins, and acrylic resins such as urethane acrylate, polyester acrylate and epoxy acrylate, and crosslinked cyanoacrylate resins.

The keypad, key top and adhesive for use in the present invention are described above. Particularly preferred is the constitution in which a transparent thermoplastic elastomer such as styrene, polyester and urethane thermoplastic elastomers is used as a material for a keypad, a light curing type reaction curing resin such as urethane resins, epoxy resins, amino resins, acrylic resins and crosslinked cyanoacrylate resins is used as a reaction curing resin, a thermoplastic resin such as polycarbonate resins, acrylic resins, styrene resins and acrylonitrile-butadiene-styrene resins is used as a material for a key top, because the constitution lends itself to a lot of design variations, and an illuminated system or a non-illuminated system can be optionally selected, but nevertheless productivity and workability are high, and also because a keypad and a key top can be easily separated, and recycling of the separated members is easy.

4. Method of Producing a Keypad with a Key Top

Since a keypad with a key top of the present invention is composed of a keypad and a key top as separate members, the keypad with the key top is manufactured by bonding these members with an adhesive. Adhesion of a key top and a keypad is carried out at first by applying an adhesive to the joining area of the keypad and the key top. For application of the adhesive, various methods may be used such as screen printing method, dispenser method, potting method, pad printing method, spray method and transfer method. After applying an adhesive, a keypad and a key top are joined at a given position.

For positioning in adhesion of a key top, a concavity and a convexity for fitting may be provided on either a keypad or a key top, or to both of them, or a jig for holding the keypad and the key top from the outside may be used.

If the keypad is poor in adhesiveness, adhesion force can be increased by performing surface modification to the surface of the keypad by at least one method of irradiation treatment of short-wavelength ultraviolet ray, corona discharge treatment, flame treatment, plasma treatment and primer treatment. Because of this surface modification, a key top can be bonded more firmly to a keypad through an adhesive.

Here, irradiation treatment of short-wavelength ultraviolet ray involves performing surface modification by irradiating short-wavelength ultraviolet ray on the surface of a keypad at a constant illuminance in a constant accumulated amount of light. For instance, radioactive rays of wavelengths of 184.9 nm and 253.7 nm are irradiated from a mercury lamp in which mercury is contained at a pressure of about $10^{-1}$ mmHg to form ozone in the presence of oxygen. The surface of an object to be treated is oxidized by the ozone to form active groups such as carboxyl group, whereby adhesion property and affinity of a printing ink, paint and the like can be improved. Corona discharge treatment involves causing dielectric breakdown due to application of a high voltage between electrodes in the atmosphere, and passing an object to be treated such as the surface of a keypad during the discharge to oxidize polymers present at the surface layer, thereby introducing active groups to the surface. Flame treatment involves passing an object to be treated such as the surface of a keypad through strong oxidizing flame to oxidize polymers present at the surface layer, thereby providing the effect of introducing active groups to the surface in the same manner as corona discharge treatment. Plasma treatment involves causing a glow discharge in inert gases, oxygen, halogen gases and the like at a low pressure to ionize gas molecules to generate a plasma, thereby activating the surface of a keypad using the chemical activity of the plasma.

To obtain stronger adhesion force, further surface modification may be carried out using various coupling agents such as known silane coupling agents, titanium coupling agents and aluminum coupling agents after these surface modifications.

After making a key top and a keypad stick together, an adhesive is cured. Methods of curing an adhesive are selected according to the kind of the reaction curing resin used as an adhesive. For example, if a crosslinked cyanoacrylate resin is used as a reaction curing resin, the adhesive can be cured and bonded by application of pressure, heat or moisture.

5. Method of Separating a Keypad with a Key Top

Since a keypad with a key top of the present invention is composed of a key top made of a thermoplastic resin and a keypad made of a thermoplastic elastomer, the bulk of the keypad with the key top is a thermoplastic material. Therefore, if the thermoplastic material is used as a material of a product that is permitted to contain a small amount of impurities, the thermoplastic material can be recycled as it is by using an organic solvent in which this thermoplastic material is dissolved, or by heat-melting a keypad with a key top as it is. However, if the key top and the keypad are recycled together, they are recycled as a raw material of a mixture of a thermoplastic resin constituting a key top and a thermoplastic elastomer constituting a keypad, to thereby cause deterioration in the quality of a recycled product. Therefore, it is necessary to separate a key top and a keypad and to recycle them separately. Furthermore, in order to use the recycled materials as high-quality materials for key tops or keypads for push buttons for use in cellular phones, demand of which has recently expanded, and remote controls for various household electric appliances, it becomes a problem when a raw material contains even a small amount of impurities. Thus to use the recycled material as a material for such products, it is desired to separate and classify an adhesive in addition to a key top and a keypad to be recycled.

An organic solvent that makes an adhesive made from a reaction curing resin swell is used to separate a key top and a keypad from a keypad with a key top. For example, soaking a keypad with a key top in a vessel containing an organic solvent for a given period of time makes an adhesive swell. In this situation, if the organic solvent in which a keypad with a key top is soaked is stirred, the adhesion interface of a key top and a keypad comes off, and thus a key top and a keypad can be separated from a keypad with a key top.

As a separation method, methods using ultrasonic vibration or jet bubble water stream as well as stirring with a stirring blade may be adopted.

The organic solvent is filtrated with a gauze sieve having openings the size of which are somewhat enough to pass a key top and not to pass a keypad, and thus key tops and keypads can be classified. After that, key tops and keypads are taken out of the organic solvent, and they are dried. Then they are dissolved in organic solvents in which each of them is dissolved, or they are molten by heating. Since the adhesive that bonds a key top and a keypad is crosslinked, it may swell with an organic solvent, but it is not dissolved in an organic solvent. In addition, it is not molten by heating, so it can be easily classified by filtration from dissolved or molten thermoplastic materials. As described above, a key top, a keypad and an adhesive can be separated and classified respectively, and each member can be separately recycled.

As a separation method of a keypad with a key top, a method of making a cured adhesive swell by spraying an organic solvent on a keypad with a key top or by placing a keypad with a key top in an atmosphere of an organic solvent as well as the above-described method of soaking it in an organic solvent can be used.

Note that, heating, stirring and the like are effective in separation of a key top and a keypad, but in some cases, a key top and a keypad can be spontaneously separated without stirring, depending on the combinations of an adhesive and an organic solvent.

Typical examples of the organic solvents that makes an adhesive made from a reaction curing resin swell include, for example, hydrocarbons, ketones, esters, ethers, chlorinated solvents, alcohols and silane compounds such as trimethylsilanol. Examples of hydrocarbon organic solvents include hexane, heptane, octane, cyclohexane, benzene, toluene and xylene. Examples of ketone organic solvents include dimethyl ketone, diethyl ketone, methyl ethyl ketone and cyclohexanone. Examples of ester organic solvents include methyl acetate and ethyl acetate, propyl acetate. Examples of ether organic solvents include ethyl methyl ether and diethyl ether. Examples of chlorinated solvents include trichloroethane, tetrachloroethane and trichloroethylene. However, any organic solvent other than these organic solvents that makes an adhesive made from a reaction curing resin swell may be used. These organic solvents may be used singly or as a mixture of two or more. Practically, solvents containing additives depending on various uses, impurities, or the like can be used.

If an alcoholic organic solvent is used, both a keypad made of a thermoplastic elastomer and a key top made of a thermoplastic resin are hardly dissolved therein, so using an alcoholic organic solvent is preferable. Furthermore, if a light curing resin is used as an adhesive, when soaking the resin in an alcohol, the resin is easy to swell and adhesion force is likely to decrease, so in terms of separation, the combination of an alcohol as an organic solvent and a light curing resin as an adhesive is the most preferable. Examples of alcohols include, for example, methanol, ethanol, 1-propanol, 2-propanol, 1-methylpropanol, 2-methylpropanol, 1-butanol, 2-butanol, and 2-methylbutanol. Functional groups such as halogen groups may be further added to these alcohols. However, long chain alcohols having 10 carbon atoms or more do not make an adhesive swell, or the degree of swelling is too small, so they are not preferable.

The present invention is concretely described below showing examples and a comparative example, and it is to be understood that the present invention is not limited thereto.

EXAMPLES

Example 1

As shown in FIG. 1, to a key top joining area 2 of a keypad 1 that was molded using an ester thermoplastic elastomer (PRIMALLOY A1603, produced by Mitsubishi Chemical Corporation), an adhesive 3 made from a two-component urethane heat reaction curing resin (7550, produced by Lord Far East, Incorporated) was applied with a dispenser. Next, a key top 5 that had a chrome-plating layer 4 on the surface and was molded with an acrylonitrile-butadiene-styrene resin (DIAPET ABS 3001M, produced by Mitsubishi Rayon Co., Ltd.) was affixed to the key top joining area 2 to which the adhesive 3 was applied. This was heated at 60° C. for an hour to cure an adhesive 3 made from a heat reaction curing resin, and a highly recyclable keypad with a key top 6 was obtained.

After this keypad with the key top 6 was soaked in ethanol for 3 hours, this liquid was stirred with a stirring apparatus equipped with a stirring blade, and the keypad with the key top 6 could be easily separated into the keypad 1 and the key top 5.

Example 2

Figure 2:
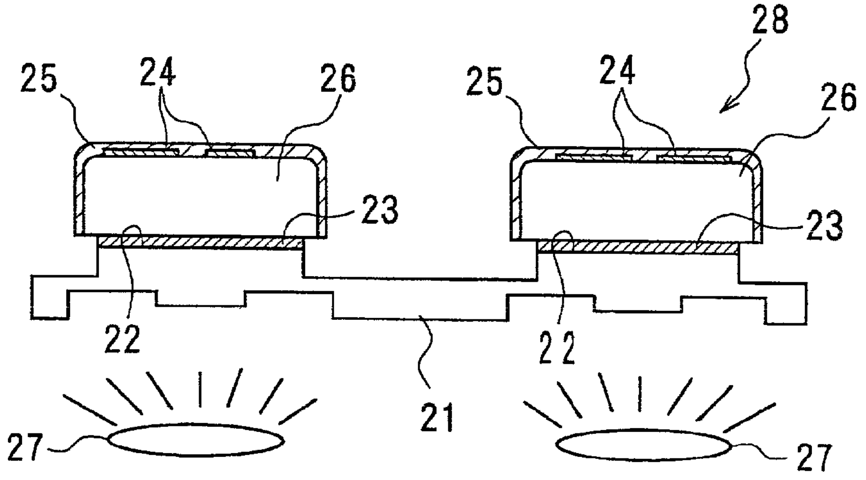
FIG. 2 is a longitudinal sectional view showing another embodiment of a keypad with a key top of the present invention.

As shown in FIG. 2, to a key top joining area 22 of a keypad 21 that was molded using a transparent ester thermoplastic elastomer (PRIMALLOY A1603, produced by Mitsubishi Chemical Corporation), an adhesive 23 made from an acrylic light reaction curing resin (3033D, produced by Three Bond Co., Ltd.) was applied with a dispenser. Next, a key top 26 made of a transparent polycarbonate resin (PANLITE L1225L, produced by Teijin Chemicals Ltd.) that had a letter-printed layer 24 on the surface and further had a transparent UV curing resin layer 25 provided so as to cover the letter-printed layer 24 was affixed to the key top joining area 22 to which the adhesive 23 was applied. This was irradiated from the keypad side with an ultraviolet ray having a dominant wavelength of 365 nm from a light source 27 at an intensity of 1000 $mW/cm^2$ for 15 seconds to cure the adhesive 23, and a highly recyclable keypad with a key top 28 was obtained.

After this keypad with the key top 28 was soaked in ethanol for 3 hours, this liquid was stirred with a stirring apparatus equipped with a stirring blade, and the keypad with the key top 28 could be easily separated into the keypad 21 and the key top 26.

Example 3

Figure 3:
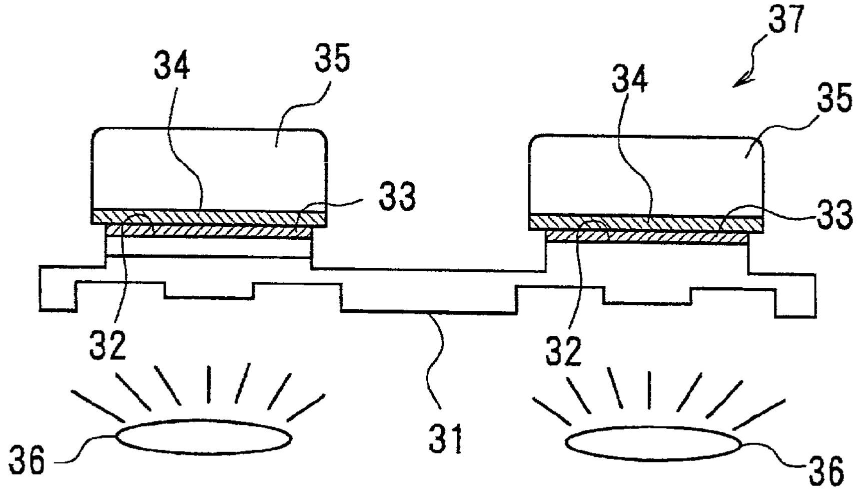
FIG. 3 is a longitudinal sectional view showing still another embodiment of a keypad with a key top of the present invention.

As shown in FIG. 3, to a key top joining area 32 of a keypad 31 that was molded using a transparent urethane thermoplastic elastomer (PELLETHANE 2103-70A, produced by The Dow Chemical Company), an adhesive 33 made from an epoxy light reaction curing resin (EVO-114, produced by Epoxy Technology, Inc.) was applied with a dispenser. Next, a key top 35 made of a transparent polystyrene resin (DENKA STYROL GP-1, produced by Denki Kagaku Kogyo Kabushiki Kaisha) that had a picture pattern-printed layer 34 formed on the backside by a printing ink (NORIPHAN, produced by Proell, Inc.) was affixed to the key top joining area 32 to which the adhesive 33 was applied. This was irradiated from the keypad side with an ultraviolet ray having a dominant wavelength of 365 nm from a light source 36 at an intensity of 1000 $mW/cm^2$ for 15 seconds to cure the adhesive 33, and a highly recyclable keypad with a key top 37 was obtained.

After this keypad with the key top 37 was soaked in methanol for 3 hours, this liquid was stirred with a stirring apparatus equipped with a stirring blade, and the keypad with the key top 37 could be easily separated into the keypad 31 and the key top 35.

Example 4

Figure 4:
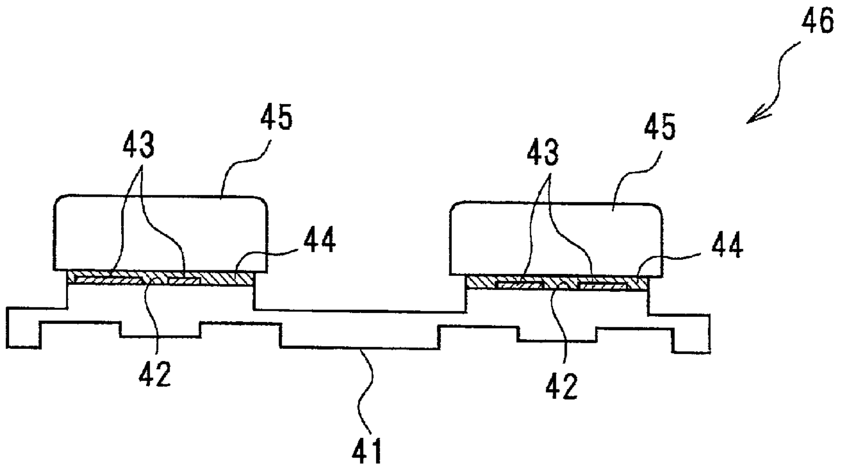
FIG. 4 is a longitudinal sectional view showing a further embodiment of a keypad with a key top of the present invention.

As shown in FIG. 4, after forming a letter-printed layer 43 on a key top joining area 42 of a keypad 41 that was molded using a transparent styrene thermoplastic elastomer (SEPTON CJ002, produced by Kuraray Plastics Co., Ltd.), an adhesive 44 made from a silicone reaction curing resin (Super X, produced by Cemedine Co., Ltd.) was applied to the key top joining area 42 with a dispenser. Next, a key top 45 that was molded with a transparent poly(methyl methacrylate) resin (ACRYPET, produced by Mitsubishi Chemical Corporation) was affixed to the key top joining area 42 to which the adhesive 44 was applied. The adhesive 44 was cured by heating, and a highly recyclable keypad with a key top 46 was obtained.

After this keypad with the key top 46 was soaked in hexane for 3 hours, this liquid was stirred with a stirring apparatus equipped with a stirring blade, and the keypad with the key top 46 could be easily separated into the keypad 41 and the key top 45.

Example 5

To a key top joining area of a keypad that was molded using a transparent styrene thermoplastic elastomer (SEPTON CJ002, produced by Kuraray Plastics Co., Ltd.), an adhesive made from an acrylic light reaction curing resin (3021, produced by Three Bond Co., Ltd.) was applied with a dispenser. Next, a key top that was molded with a transparent polycarbonate resin (PANLITE L1225L, produced by Teijin Chemicals Ltd.) was affixed to the key top joining area to which the adhesive was applied. This was irradiated from the keypad side with an ultraviolet ray having a dominant wavelength of 365 nm from a light source at an intensity of 1000 $mW/CM^2$ for 15 seconds to cure the adhesive, and a keypad with a key top was obtained.

After this keypad with the key top was soaked in diethyl ether for 3 hours, this liquid was stirred with a stirring apparatus equipped with a stirring blade, and the keypad with the key top could be easily separated into the keypad and the key top.

Example 6

Figure 5:
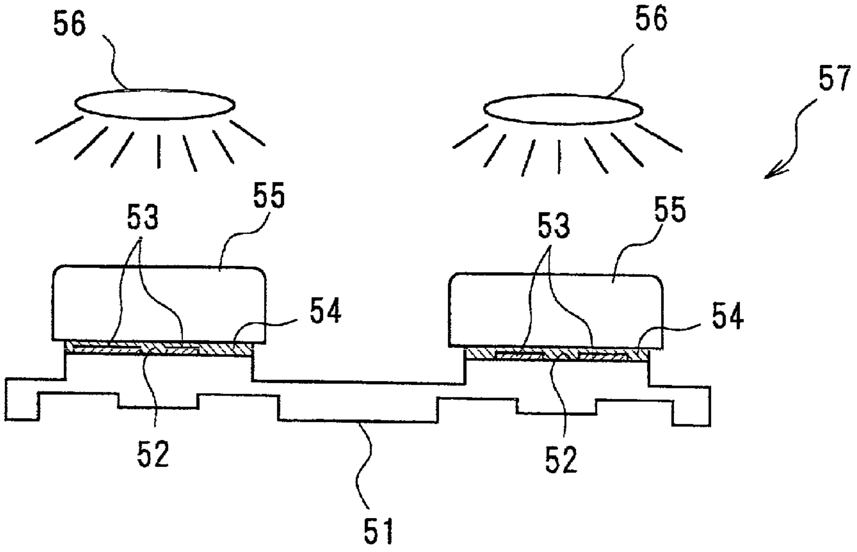
FIG. 5 is a longitudinal sectional view showing still a further embodiment of a keypad with a key top of the present invention.

As shown in FIG. 5, after forming a letter-printed layer 53 on a key top joining area 52 of a keypad 51 that was molded using a transparent styrene thermoplastic elastomer (SEPTON CJ002, produced by Kuraray Plastics Co., Ltd.), an adhesive 54 made from an acrylic light reaction curing resin (3033D, produced by Three Bond Co., Ltd.) was applied to the key top joining area 52 with a dispenser. Next, a key top 55 that was molded with a transparent poly(methyl methacrylate) resin (ACRYPET, produced by Mitsubishi Chemical Corporation) was affixed to the key top joining area 52 to which the adhesive 54 was applied. This was irradiated from the key top side with an ultraviolet ray having a dominant wavelength of 365 nm from a light source 56 at an intensity of 1000 mW/cm$^2$ for 15 seconds to cure the adhesive 54, and a highly recyclable keypad with a key top 57 was obtained.

After this keypad with the key top 57 was soaked in 1-butanol for 24 hours, this liquid was stirred with a stirring apparatus equipped with a stirring blade, and the keypad with the key top 57 could be easily separated into the keypad 51 and the key top 55.

Comparative Example

To the key top joining area of a keypad that was molded using a transparent styrene thermoplastic elastomer (SEPTON CJ002, produced by Kuraray Plastics Co., Ltd.), an adhesive made from an acrylic light reaction curing resin (3021, produced by Three Bond Co., Ltd.) was applied with a dispenser. Next, a key top that was molded with a transparent polycarbonate resin (PANLITE L1225L, produced by Teijin Chemicals Ltd.) was affixed to the key top joining area to which the adhesive was applied. This was irradiated from the keypad side with an ultraviolet ray having a dominant wavelength of 365 nm from a light source at an intensity of 1000 mW/cm$^2$ for 15 seconds to cure the adhesive, and a keypad with a key top was obtained.

After this, the keypad with the key top was soaked in ethanol for 3 hours, and the liquid was stirred, but the keypad with the key top could not be separated into the keypad and the key top.

The amount of swelling was measured when the adhesives that were used in the above Examples 1, 2 and 5, and Comparative Example were soaked in the organic solvent that was used in Examples 1, 2 and 5, and Comparative Example, that is, ethanol and diethyl ether, respectively. The results are shown in Table 1 and FIG. 6.

TABLE 1

| | The Rates of Weight Increase from the Initial Weight (% by weight) | | | | | |
|---|---|---|---|---|---|---|
| Testing Time (h) | 0 | 3 | 6 | 12 | 24 | 48 |
| Sample A | 0.0 | 2.3 | 4.2 | 7.4 | 10.6 | 10.9 |
| Sample B | 0.0 | 1.7 | 3.5 | 7.1 | 12.8 | 19.7 |
| Sample C | 0.0 | 1.9 | 3.0 | 4.3 | 5.5 | 6.7 |
| Sample D | 0.0 | 0.0 | 0.0 | 0.0 | 0.0 | 0.0 |

In the measurement of the amount of swelling, reaction curing resins used as an adhesive were reacted by themselves to be cured, and each resin was molded so that every resin had the same surface area to obtain samples. The sample including the adhesive used in Example 1 was Sample A, the sample including the adhesive used in Example 2 was Sample B, the sample including the adhesive used in Example 5 was Sample C, and the sample including the adhesive used in Comparative Example was Sample D. Subsequently, Samples A, B and D were soaked in ethanol, and Sample C was soaked in diethyl ether. As the amount of swelling, the rate (percentage) of weight increase of each sample after a given period of time elapsed was measured.

During the experiment period, Samples A, B and D were not dissolved in ethanol, and Sample C was not dissolved in diethyl ether. However, softening due to swelling was found in Samples A, B and C. On the other hand, almost no change in properties was observed in Sample D.

From the above Examples and Comparative Example and the experiment to measure the amount of swelling of an adhesive, a keypad with a key top of the present invention using an adhesive that swelled could be easily separated into a keypad and a key top. On the contrary, a keypad that is adhered to a key top, according to the Comparative Example using an adhesive that did not swell, was difficult to separate.

Figure 6:
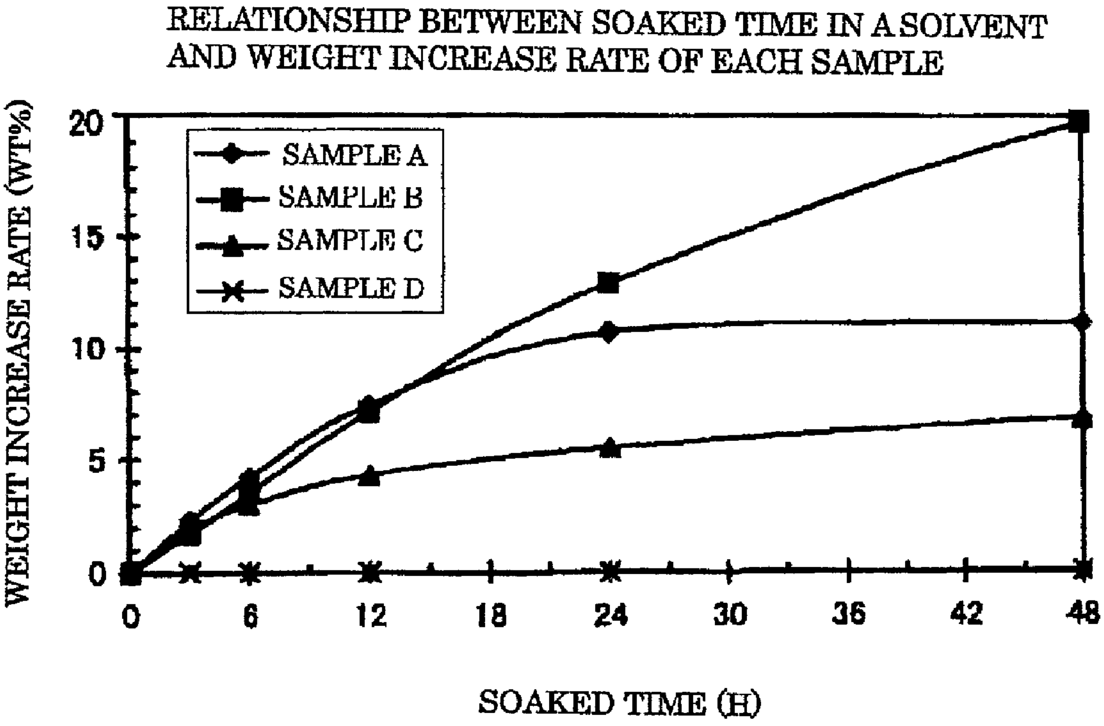
FIG. 6 is a graph showing the amounts of swelling of adhesives for use in the present invention.

Moreover, any swelling experiments as shown in Table 1 or FIG. 6 were not performed on the combination of the adhesive and the solvent used in each of Examples 3, 4 and 6. However, if experiments are carried out, each adhesive is supposed to swell. Furthermore, in spite of using the same adhesive in Example 5 and Comparative Example, a keypad and a key top were separated in Example 5 where diethyl ether was used as a solvent, and on the contrary, a keypad and a key top were not separated in Comparative Example where ethanol was used as a solvent. From these results, it is found that whether there is swelling of an adhesive or not, or the degree of swelling varies depending on the kinds of organic solvents.

INDUSTRIAL APPLICABILITY

A keypad with a key top of the present invention uses a recyclable thermoplastic elastomer for a keypad and a recyclable thermoplastic resin for a key top respectively, so a keypad and a key top can be bonded quickly and firmly, and high productivity can be maintained. In addition, since a reaction curing resin that swells with an organic solvent and is not dissolved in an organic solvent and is not molten by heating is used as an adhesive, a keypad and a key top can be easily separated by soaking the keypad with the key top in an organic solvent, and thus this keypad with the key top is excellent in recyclability.

Moreover, if a transparent thermoplastic elastomer is used as a material for a keypad, and a light curing resin is used as an adhesive, as compared with using other heat curing resins or moisture curing resins, workability and productivity are improved. And even if a resin having relatively low heat resistance is used for a key top, or even if a thermoplastic elastomer having relatively low heat resistance is used for a keypad, a keypad with a key top can be manufactured without affecting the quality of a product at all.

Furthermore, according to the method for separating a keypad with a key top of the present invention, a key top and a keypad can be easily separated only by subjecting a keypad with a key top to an organic solvent. Since the adhesive can be removed, mixed impurities can be reduced, and thus, it is possible to perform high-quality recycling. In particular, by using an alcohol as an organic solvent, a keypad portion and a key top portion can be separated without being dissolved in an organic solvent, and each of them can be recycled separately.

What is claimed is:

1. A keypad with a key top, comprising:

a key top, a keypad, and an adhesive for bonding the key top and the key pad to each other, wherein:

the key top is made of a thermoplastic resin;

the keypad is made of a thermoplastic elastomer; and the adhesive is made of a cross-linked reaction curing resin and has a characteristic that swells after curing when contacting with an organic solvent, wherein the characteristic is a weight increase of 2% by weight or greater due to contact with the organic solvent which includes a substance from the group comprising a hydrocarbon, a ketone, an ester, an ether, a chlorinated solvent, an alcohol, and a silane.

2. A keypad with a key top according to claim 1, wherein the adhesive is made from a reaction curing resin that swells when contacted with an alcoholic organic solvent having less than 10 carbon atoms.

3. A keypad with a key top according to claim 1, wherein the adhesive is made from a reaction curing resin that swells when contacted with an alcoholic organic solvent having less than 10 carbon atoms.

4. A keypad with a key top according to any one of claims 1, 2 and 3, wherein:

the keypad is made of at least one thermoplastic elastomer selected from the group consisting of styrene thermoplastic elastomers, ester thermoplastic elastomers and urethane thermoplastic elastomers;

the key top is made of at least one thermoplastic resin selected from the group consisting of polycarbonate resins, acrylic resins, styrene resins and acrylonitrile-butadiene-styrene resins; and the adhesive is made from at least one reaction curing resin selected from the group consisting of urethane resins, epoxy resins, amino resins, acrylic resins and crosslinked cyanoacrylate resins.

5. A keypad with a key top according to claim 1, wherein the hydrocarbon includes a substance from the group comprising hexane, heptane, octane, cyclohexane, benzene, toluene and xylene.

6. A keypad with a key top according to claim 1, wherein the ketone includes a substance from the group comprising dimethyl ketone, diethyl ketone, methyl ethyl ketone and cyclohexanone.

7. A keypad with a key top according to claim 1, wherein the ester includes a substance from the group comprising methyl acetate and ethyl acetate, propyl acetate.

8. A keypad with a key top according to claim 1, wherein the ether includes a substance from the group comprising ethyl methyl ether and diethyl ether.

9. A keypad with a key top according to claim 1, wherein the chlorinated solvent includes a substance from the group comprising trichloroethane, tetrachloroethane and trichloroethylene.

10. A keypad with a key top according to claim 1, wherein the alcohol includes a substance from the group comprising methanol, ethanol, 1-propanol, 2-propanol, 1-methylpropanol, 2-methylpropanol, 1-butanol, 2-butanol, and 2-methylbutanol.

11. A keypad with a key top according to claim 1, wherein the silane compound is trimethylsilanol.

* * * * *